United States Patent [19]
Leighty

[11] 4,071,107
[45] Jan. 31, 1978

[54] ENGINE SIDE GUARD MOUNTING
[75] Inventor: Conard E. Leighty, Metamora, Ill.
[73] Assignee: Caterpillar Tractor Co., Peoria, Ill.
[21] Appl. No.: 727,188
[22] Filed: Sept. 27, 1976
[51] Int. Cl.[2] .............................................. B62D 25/12
[52] U.S. Cl. ................................................. 180/69 R
[58] Field of Search ................ 180/69 R, 54 A, 89 R; 280/153 R, 477, 164 R; 292/DIG. 23, DIG. 1, DIG. 5

[56] References Cited
U.S. PATENT DOCUMENTS

| 3,865,210 | 2/1975 | Fummetti et al. | 180/69 R |
| 3,873,148 | 3/1975 | Kennicuit | 280/106 R X |

Primary Examiner—Joseph F. Peters, Jr.
Assistant Examiner—Gene A. Church
Attorney, Agent, or Firm—Phillips, Moore, Weissenberger, Lempio & Majestic

[57] ABSTRACT

The invention is concerned with an improvement in an engine compartment of a vehicle which includes an opening through a sidewall thereof and a panel secured to cover said opening and removable to allow access to components within said compartment. The improvement comprises an improved mounting for attachment of the panel to the engine compartment. The improved mounting comprises a metallic plate rigidly affixed to a first side of the sidewall and having a portion thereof extending to the vicinity of the opening and a metal leaf rigidly affixed to a second side of the sidewall and having a portion thereof extending to the vicinity of the opening in alignment with and a spaced distance from the extending plate portion, the leaf and the plate defining a mouth for accepting the panel, the spaced distance being smaller than the thickness of the panel thereadjacent. Generally, a plurality of mountings are used along a first edge of the opening and serve to hold a first edge of the panel thereadjacent.

12 Claims, 4 Drawing Figures

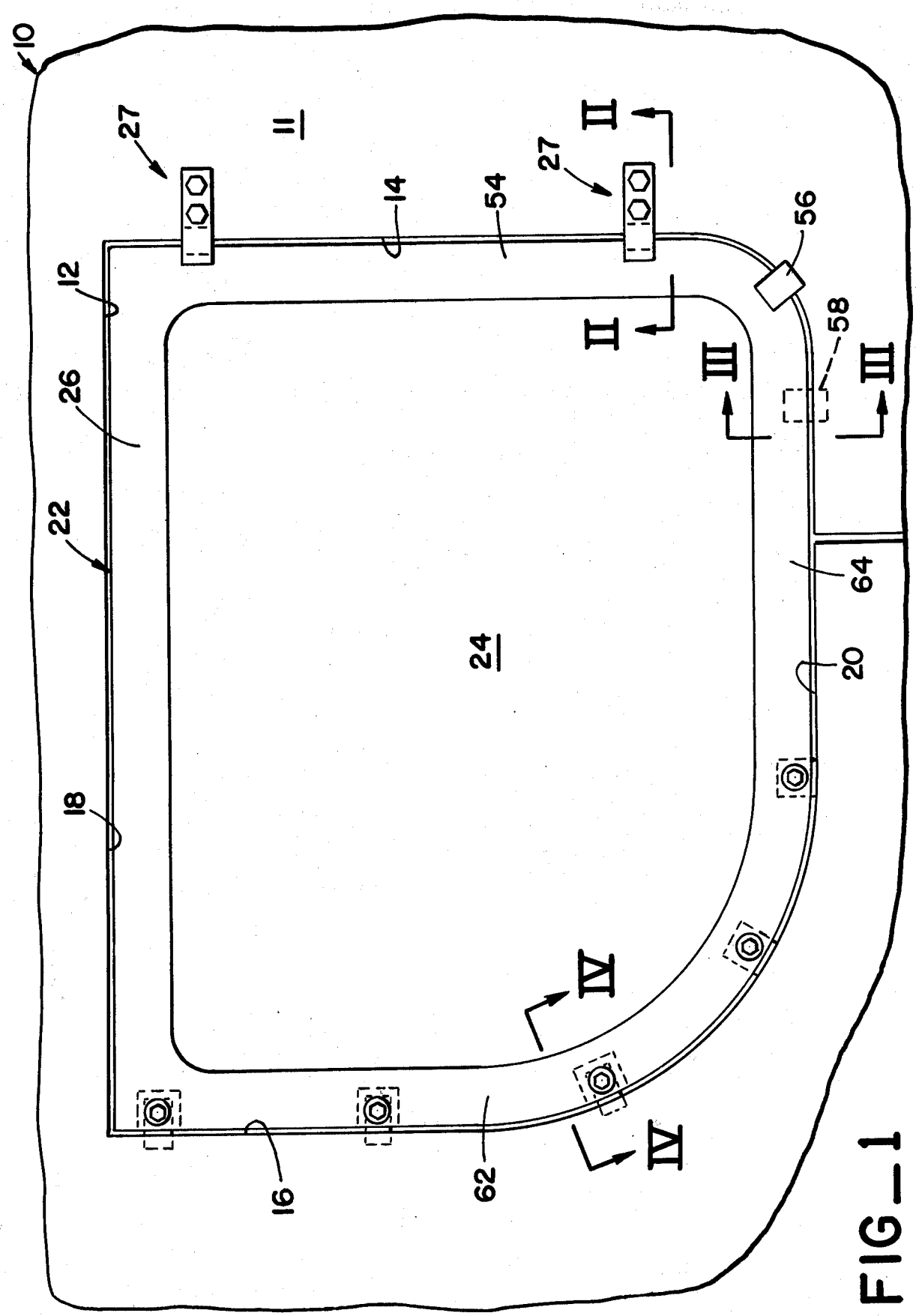
FIG_1

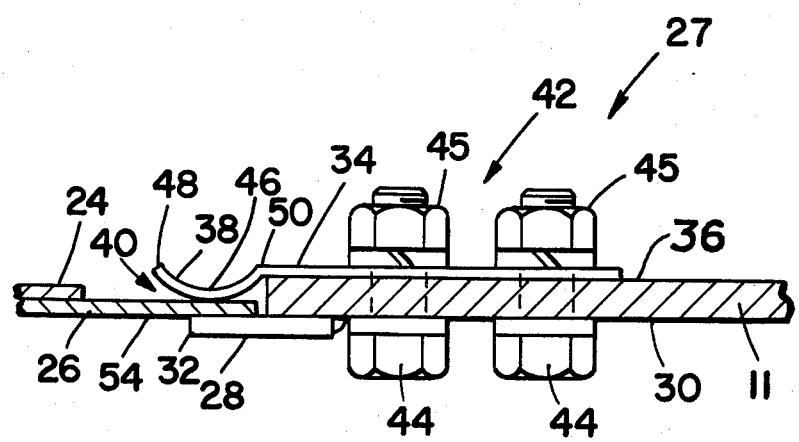
FIG_2
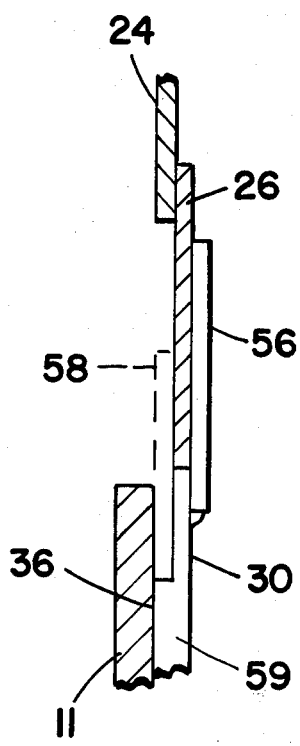
FIG_3
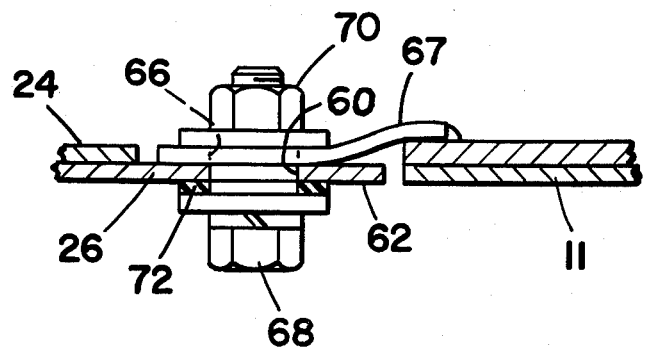
FIG_4

ENGINE SIDE GUARD MOUNTING

BACKGROUND OF THE INVENTION

Field of the Invention

The invention is concerned with a removable guard or panel for the side of an engine compartment or the like. More particularly, the invention is concerned with a particularly advantageous mounting means for a panel which allows the panel to be quickly inserted in place, held in place with relatively little vibration, and easily removed. Still more particularly, the invention is concerned with such a mounting means which provides the advantage of being extremely rugged and being generally wholly metallic in construction, thus eliminating the need for elastomeric or plastic parts which might wear out and require periodic replacement.

The provision of openings through sidewalls of engine compartments to allow access to components within engine compartments is, of course, well known. U.S. Pat. No. 3,873,148 commonly assigned herewith and U.S. Design Pat. No. 203,620 also commonly assigned herewith, both show vehicles having engine compartments with an opening therethrough. U.S. Pat. No. 3,873,148 shows such a compartment with a plurality of tabs extending into the opening and to which a panel can be attached. A number of problems exist with the prior art means for mounting a panel to close off such an opening into an engine compartment. First, there is the problem that it generally takes a relatively large period of time to fasten down bolts all around the edge of a panel or around at least two, and generally at least three, of the edges of a panel so as to hold the panel rigidly in place. Second, there is the problem that with rigid attachment of the panel about the periphery of the opening in the engine compartment, vibration problems occur, and, in order to cut down the vibration problems and the noise therefrom, it has often been necessary to use elastomeric or plastic washers or the like in conjunction with the bolts which fasten the panel over the opening. Often the elastomeric or plastic material has not been rugged enough to stand repeated fastenings and unfastenings and has required replacement. This is both expensive and time consuming, especially if the replacement parts are not easily available, and, of course, in the absence of replacing the elastomeric or plastic materials the noise level and the vibration has often been objectionable. Third, and of considerably more importance, it has been found that when a panel is rigidly attached over an opening in an engine compartment the flexing of the main frame of the vehicle and of the sidewall of the engine compartment has led to a shearing of the bolts which serve as the panel mounting means. Generally, the bolts which have been sheared are the forward bolts which are those nearest the front idler of an endless track-driven vehicle, or the front wheels of a tire-driven vehicle.

The present invention provides a non-rigid means for mounting a panel over an opening through an engine compartment sidewall. The mounting means can be, and generally is, formulated solely of metallic members, thus eliminating any problems with deterioration of elastomeric or plastic members. The mounting is not completely rigid, and thus shearing problems are completely eliminated. Further, the mounting is sufficiently resilient so that vibration problems do not occur whereby the use of elastomeric or plastic materials is not necessary to ensure relatively low vibration and noise. Still further, the mounting means of the present invention allows much quicker access to the interior of the engine compartment since a lesser number of bolts need be detached in order to remove the panel from the opening. These and other advantages, as will become apparent when reading the specification and claims which follow, are attributes of the present invention.

SUMMARY OF THE INVENTION

The invention comprises an improved mounting means for mounting a panel to an engine compartment. The improved mounting means is used in an engine compartment of a vehicle which includes an opening through a sidewall thereof and a panel secured to cover the opening and removable to allow access to components within the compartment. The mounting means comprises a metallic plate rigidly affixed to a first side of the sidewall and having a portion thereof extending to the vicinity of the opening and a metal leaf rigidly affixed to a second side of the sidewall and having a portion thereof extending to the vicinity of the opening in alignment with and spaced a distance from the extending plate portion, the extending leaf portion and the extending plate portion defining a mouth for accepting the panel, the spaced distance being smaller than the thickness of the panel thereadjacent.

BRIEF DESCRIPTION OF THE DRAWINGS

The invention will be better understood by reference to the figures of the drawings wherein like numbers denote like parts throughout and wherein:

FIG. 1 illustrates an engine compartment of a vehicle which includes the mounting means of the present invention for a panel over an opening therethrough;

FIG. 2 illustrates in blown-up view taken along line II—II of FIG. 1, partially in section, the mounting means of the present invention;

FIG. 3 illustrates in blown-up view taken along line III—III of FIG. 1, partially in section a structure which in some embodiments of the present invention forms a part of the mounting means thereof; and FIG. 4 illustrates in blown-up view, partially in section, mounting means of the prior art,

DETAILED DESCRIPTION OF THE PREFERRED EMBODIMENT

Referring to FIG. 1, there is illustrated therein an engine compartment 10 of the present invention, with a sidewall 11 having an opening 12 therethrough. The opening 12 has a front edge 14, a rear edge 16, a top edge 18 and a bottom edge 20. In a usual manner, the front edge 14 is toward the front of a vehicle which supports the engine compartment 10, the rear edge 16 is towards the rear of the engine compartment 10 of the vehicle, etc. A panel 22, shown in FIG. 1, covers the opening 12 which is in the sidewall 11 of the engine compartment 10. The panel 22 is removable to allow access through the opening 12 to components within the engine compartment 10. The panel 22 comprises a flat member 24 with a lip 26 extending outwardly circumferentially therefrom with the lip 26 being in a plane spaced from the flat member 24.

Turning now to FIG. 2, there is illustrated therein an improved means of the present invention for mounting the panel 22 to the sidewall 11 of the engine compartment 10, namely an improved plurality of non-shear mounting members 27. The mounting means is shown as comprising a metallic plate 28 which is rigidly affixed to a first side 30 of the sidewall 11, which first side 30 is generally the outside of the engine compartment 10. The metallic plate 28 has a portion 32 thereof which extends to the vicinity of the opening 12. Fastening of the metallic plate 28 to the first side 30 of the sidewall 11 is generally by welding or the like. A metal leaf 34 is rigidly affixed to a second side 36 of the sidewall 11 with the second side 36 generally being the inside of the engine compartment 10. The metal leaf 34 has a portion 38 thereof which extends to the vicinity of the opening 12 in alignment with and a spaced distance from the extending portion 32 of the metallic plate 28. The extending portion 32 of the metallic plate 28 and the extending portion 38 of the metal leaf 34 together define a mouth 40 for accepting the panel 22 or, more particularly, the lip 26 thereof. The spaced distance between the portion 32 of the metallic plate 28, and the portion 38 of the metal leaf 34 is smaller than the thickness of the lip 26 of the panel 22. In this manner, a press fit is assured between the portion 32 of the metallic plate 28 and the portion 38 of the metal leaf 34.

In the preferred embodiment illustrated in FIG. 2, the metal leaf 34 is made of a spring metal to assure a firm holding of the lip 26 of the panel 22. This assures that vibrations and noise are minimized and it allows the lip 26 to move laterally with respect to the metallic plate 28 and the metal leaf 34, without causing any shearing forces to act upon the bolt means 42. In the embodiment illustrated in FIG. 2, a pair of bolts 44 and a corresponding pair of nuts 45, which hold the metal leaf 34 in place against the sidewall 11 of the engine compartment 10 serve as the bolt means 42. It will be noted, once again, that, by reference to FIG. 2, the bolts 44 generally have their head ends on the outside of the engine compartment 10 so as to allow their easy installation, removal and replacement. It will further be noted that the screw ends of the bolts 44 generally pass through the sidewall 11 and are held by the nuts 45 adjacent the inside of the sidewall 11. Thus, assembly and disassembly problems are minimized.

As will further be noted by reference to FIG. 2, the extending portion 38 of the metal leaf 34 is preferably arcuate in longitudinal cross section whereby a central region 46 thereof is closer to the extending portion 32 of the metallic plate 28 than is a first end 48 of the extending portion 38, which first end 48 extends further out over the opening 48, and a second end 50 of the extending portion 38, which terminates adjacent to the second side 36 of the sidewall 11. In this manner, the mouth 40 is generally arcuate to allow guidance of the lip 26 of the cover 22 between the plate 28 and the metal leaf 34.

Generally, the mounting means of the present invention, will include the plurality of non-shear mounting members 27, as illustrated in FIG. 2, extending along a first edge, generally the front edge 14, of the opening 12. As illustrated in FIG. 1, there are a pair of mounting members 27 along the front edge 14 of the opening 12. In this manner, a first edge 54 of the lip 26 is grasped by the pair of members 27.

As will be noted most clearly by reference to FIGS. 1 and 3, the improved cover mounting means of the present invention preferably includes extending in the vicinity of the opening 12 adjacent the front edge 14 thereof, and from a second edge thereof, generally the bottom edge 20, which second edge is generally perpendicular to said front edge 14, a first tongue 56 extending from the first side 30 of the sidewall 11 of the compartment 10, and a second tongue 58 extending in the vicinity of the opening 12 from the second side 36 of the sidewall 11 of the edge of compartment 10. The second side 36 of the sidewall 11 adjacent the second tongue 58 is generally bent outward to form a raised portion 59 thereof. The first and second tongues 56 and 58 are generally spaced laterally from each other along the bottom edge 20 and serve to align the panel 22 so that the first edge 54 of the lip 26 of the panel 22 is guided by the tongues 56 and 58 to between each of the respective plates 28 and leafs 34 of the respective pair of members 27. It will be apparent that not only do the tongues 56 and 58 guide the first edge 54 of the lip 26 into the respective members 27, but that further the tongues 56 and 58 provide significant support for the lip 26 generally along the bottom edge 20 of the opening 12.

Referring now most particularly to FIGS. 1 and 4, there is illustrated therein, a prior art structure which finds use as part of the improved cover mounting means of the present invention, namely, a plurality of holes 60 generally in a second edge 62 of the lip 26. Similarly, at least one hole 60 will generally pass through a third edge 64 of the lip 26, with the second edge 62 of the lip 26 being adjacent to the rear edge 16 of the opening 12 and the third edge 64 of the lip 26 being adjacent to the bottom edge 20 of the opening 12. Through each of the holes 60 and corresponding holes 66 in supports 67 proceeding to adjacent to the respective second edge 62 and/or third edge 64 of the lip 26, bolts 68 are passed and fastened via nuts 70. To reduce vibrational noise, and to ensure a tight holding of the respective second edge 62 and third edge 64 of the lip 26, compressible elastomeric washers 72 can be provided about each of the bolts 68.

It is clear that the first edge 54 of the lip 26 can readily move generally laterally between the top edge 18 and the bottom edge 20 of the opening 12 without causing any significant shearing forces upon the member 34. Thus, shearing of, for example, the bolts 44 of the member 27 is not a problem. The use of the two bolts 44 in the member 27 as previously mentioned, is particularly advantageous in that in the two bolts 44 which are linearly spaced further away from the opening 12, any frictional shear force which might be transmitted from the first edge 54 of the lip 26 of the panel 22 to the respective member 27, is braced by the couple produced by the shafts of the bolts 44. Thus, neither of the pair of bolts 44 is subjected to severe shear forces, and further the pair of bolts 44 form a brace against minor shear forces.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. In an engine compartment of a vehicle which includes an opening through a sidewall thereof and a panel secured to cover said opening and removable to allow access to components within said compartment, an improved means for mounting said panel to said engine compartment, comprising:

a metallic plate rigidly affixed to a first side of said sidewall, and having a portion thereof extending to the vicinity of said opening; and a metal leaf rigidly affixed to a second side of said sidewall, and having a portion thereof extending to the vicinity of said opening in alignment with and a spaced distance from said extending plate portion, said extending leaf portion and extending plate portion defining a mouth for accepting said panel, said spaced distance being smaller than the thickness of said panel thereadjacent.

2. An improved panel mounting means as in claim 1, wherein said extending leaf portion is made of spring metal and is arcuate in longitudinal cross section whereby a central region thereof is closer to said extending portion of said plate than is a first end thereof which extends further over said opening and a second end thereof which terminates adjacent said second side of said sidewall to provide an enlarged mouth for guiding said panel to between said extending plate portion and said extending leaf portion.

3. An improved panel mounting means as in claim 2, wherein said first side and second side, respectively, of said sidewall comprise the outside and inside, respectively, of said engine compartment, said leaf includes a side mating portion extending along the inside of said engine compartment and including a plurality of affixing means sequentially further spaced from said opening fastening said side mating leaf portion to said inside of said engine compartment preventing rotation of said leaf about said affixing means relative to said sidewall.

4. An improved panel mounting means as in claim 3, wherein said affixing means comprise nut and bolt means.

5. In an engine compartment of a vehicle which includes an opening through a sidewall thereof, and a panel secured to cover said opening and removable to allow access to components within said compartment, an improved means for mounting said panel to said engine compartment comprising:

a plurality of metallic plates each rigidly affixed to a first side of said sidewall and having a portion thereof extending to the vicinity of said opening; and a plurality of metal leafs rigidly affixed to a second side of said sidewall in one-to-one relation to said metallic plates and having a portion thereof extending to the vicinity of said opening in alignment with and a spaced distance from said extending plate portion, said extending leaf portion and said extending plate portion defining a mouth for accepting said panel, said spaced distance being smaller than the thickness of said panel thereadjacent.

6. An improved panel mounting means as in claim 5, wherein said extending leaf portion is arcuate in longitudinal cross section whereby a central region thereof is closer to said extending portion of said plate than is the first end thereof which extends further above said opening and a second end thereof which terminates adjacent to the second side of said sidewall to provide an enlarged mouth for guiding said panel between said extending plate portion and said extending leaf portion.

7. An improved panel mounting means as in claim 6, wherein said first side and second side, respectively, of said sidewall comprises the outside and inside, respectively, of said engine compartment, said leaf includes a side mating portion extending along the inside of said engine compartment and including a plurality of affixing means sequentially further spaced from said opening fastening said side mating leaf portion to said inside of said engine compartment preventing rotation of said leaf about said affixing means relative to said sidewall.

8. The improved panel mounting means as in claim 7, wherein said affixing means comprises a bolt and nut means.

9. An improved panel mounting means as in claim 8, wherein said plurality of metallic plates and plurality of metal leafs are aligned along a first edge of said opening for holding a first edge of said panel thereadjacent.

10. An improved panel mounting means as in claim 9, including extending into the vicinity of said opening adjacent said first edge thereof from a second edge thereof which is generally perpendicular to said first edge thereof and adapted to be aligned with a second edge of said panel, a first tongue extending from adjacent the inside of said compartment and a second tongue extending from adjacent the outside of said compartment, said first and second tongues being spaced laterally along said second edge of said opening from one another and serving to align said panel so that said first edge thereof is guided by said tongues to between each respective of said extending plate portions and said extending leaf portions.

11. An improved panel mounting means as in claim 10, wherein said panel includes a plurality of holes therethrough adjacent to a third edge thereof, said third edge being generally parallel to said first edge thereof, said sidewall includes a plurality of bolt-accepting means adjacent a third edge of said opening corresponding to said third edge of said panel, and including bolt means for fastening said holes to said bolt-accepting means.

12. An improved panel mounting means as in claim 11, wherein said first edge of said opening comprises the front edge thereof, said second edge of said opening comprises the bottom edge thereof and said third edge of said opening comprises the rear edge thereof.

* * * * *